(12) United States Patent
Matsumoto et al.

(10) Patent No.: US 6,497,212 B2
(45) Date of Patent: Dec. 24, 2002

(54) CONTROL APPARATUS FOR A CYLINDER INJECTION TYPE INTERNAL COMBUSTION ENGINE CAPABLE OF SUPPRESSING UNDESIRABLE TORQUE SHOCK

(75) Inventors: Toshiki Matsumoto, Kariya (JP); Mamoru Mabuchi, Kariya (JP)

(73) Assignee: Denso Corporation, Kariya (JP)

( * ) Notice: Subject to any disclaimer, the term of this patent is extended or adjusted under 35 U.S.C. 154(b) by 154 days.

(21) Appl. No.: 09/778,719

(22) Filed: Feb. 8, 2001

(65) Prior Publication Data

US 2001/0013329 A1 Aug. 16, 2001

(30) Foreign Application Priority Data

| Feb. 10, 2000 | (JP) | ................................ 2000-038145 |
| Feb. 15, 2000 | (JP) | ................................ 2000-041345 |
| Feb. 18, 2000 | (JP) | ................................ 2000-046743 |

(51) Int. Cl.⁷ ..................... F02D 45/00; F02D 41/14
(52) U.S. Cl. .................... 123/295; 123/399; 123/436
(58) Field of Search .................. 123/295, 300, 123/305, 298, 299, 430, 478, 480; 180/197; 701/102, 110, 114

(56) References Cited

U.S. PATENT DOCUMENTS

| 4,938,100 A | * | 7/1990 | Yoshimura et al. | ......... 477/109 |
| 5,797,370 A | * | 8/1998 | Kimura et al. | ............... 123/478 |
| 6,155,230 A | * | 12/2000 | Iwano et al. | ................. 123/399 |
| 6,227,163 B1 | * | 5/2001 | Enoki et al. | ................. 123/295 |

FOREIGN PATENT DOCUMENTS

| EP | 0 549 810 A1 | * | 7/1993 | ........... F02D/41/14 |
| JP | 10-47111 | | 2/1998 | |
| JP | 11-22517 | | 1/1999 | |
| JP | 11-50889 | | 2/1999 | |
| JP | 2000-227044 A | * | 8/2000 | ........... F02D/41/34 |

* cited by examiner

Primary Examiner—Hieu T. Vo
(74) Attorney, Agent, or Firm—Nixon & Vanderhye P.C.

(57) ABSTRACT

The present invention intends to suppress torque variation caused by the change of control parameters (e.g., throttle opening degree, EGR amount, etc.) to be adjusted to maintain stable combustion conditions before and after the switching of combustion mode. To this end, in a homogeneous combustion mode, the indicated torque request is corrected based on a torque efficiency (both air-fuel ratio efficiency and ignition timing efficiency), thereby correcting a target air amount in accordance with the corrected indicated torque request. Furthermore, in a stratified combustion mode, the indicated torque request is corrected based on a torque efficiency (only air-fuel ratio efficiency), thereby correcting a target fuel amount in accordance with the corrected indicated torque request. Furthermore, in the homogeneous combustion mode, it is possible to suppress the torque variation by performing ignition timing correction in addition to the target air amount correction.

9 Claims, 8 Drawing Sheets

CONTROL APPARATUS FOR A CYLINDER INJECTION TYPE INTERNAL COMBUSTION ENGINE CAPABLE OF SUPPRESSING UNDESIRABLE TORQUE SHOCK

BACKGROUND OF THE INVENTION

The present invention relates to a control apparatus of an internal combustion engine which is capable of suppressing undesirable torque variation not intended by a driver.

Furthermore, this invention relates to a cylinder injection type internal combustion engine which selectively changes the combustion mode in accordance with engine operating conditions between a stratified combustion mode (i.e., combustion mode injecting fuel at a compression stroke) and a homogeneous combustion mode (i.e., combustion mode injecting fuel at an intake stroke).

Moreover, this invention relates to a control apparatus of an internal combustion engine which controls the engine based on an intended torque request.

Recent trend of low fuel consumption, low exhaust emission, and high output power is increasing the necessity of cylinder injection type internal combustion engine (i.e., direct injection engine). The unexamined Japanese patent publication 10-47111 discloses a cylinder injection engine. When the engine operates in a low load condition, a small amount of fuel is directly injected into a cylinder at a compression stroke to form a stratified mixture in the cylinder for realizing stratified combustion which is advantageous to improve fuel economy. On the other hand, in a high load condition, a relatively large amount of fuel is directly injected into a cylinder at an intake stroke to form a uniform or homogeneous mixture in the cylinder for realizing uniform or homogeneous combustion which is advantageous to produce high output power.

According to the cylinder injection engine, it is necessary to maintain stable combustion condition before and after switching of combustion mode. To this end, generally performed is adjustment of a throttle opening degree and/or adjustment of an exhaust gas recirculation (i.e., EGR) amount. However, changing the throttle opening degree and/or the EGR valve opening degree induces a change of air-fuel ratio in the cylinder as well as a change of pumping loss. This possibly causes undesirable variation or fluctuation of an axle torque of the engine, causing a significant torque shock.

The unexamined Japanese patent publication 11-22517 introduces a control system correcting the air-fuel ratio in response to the switching from the stratified combustion mode (i.e., combustion mode injecting fuel at a compression stroke) to the homogeneous combustion mode (i.e., combustion mode injecting fuel at an intake stroke) or vice versa.

However, adjusting the air-fuel ratio in response to the switching of combustion mode will cause undesirable shift of the air-fuel ratio which possibly brings the combustion of engine into an unstable condition.

Regarding the undesirable torque variation or shock caused by the switching of combustion mode, similar problems will occur in lean burn engines which change the air-fuel ratio between a lean operation and a stoichiometric/rich operation.

Furthermore, according to recent electronically controlled engines, realizing good drivability responsive to a driver's accelerator operation is very important. For example, an driver's requested acceleration force (torque) can be estimated based on a throttle opening degree, a fuel injection amount, and an ignition timing etc. This is generally referred to as torque on demand control (refer to unexamined Japanese patent publication 11-50889).

However, if the intended torque request is calculated based on only a static torque loss (such as mechanical friction loss and pumping torque loss), the response of the vehicle does not meet the driver's request in an accelerating condition where the engine speed promptly changes in a wide range.

SUMMARY OF THE INVENTION

In view of the problems of the conventional engine control techniques, the present invention has an object to provide a control apparatus for an internal combustion engine which is capable of suppressing undesirable torque variation while maintaining stable combustion even in a situation where control parameters inducing a significant torque variation are adjusted.

To accomplish the above and other related objects, the present invention provides a first control apparatus for an internal combustion engine comprising judging means for judging a torque amount requested by a driver, and control means for controlling operating conditions of an internal combustion engine based on the requested torque amount. Furthermore, the first control apparatus includes torque variation suppressing means, responsive to adjustment of a subjective control parameter causing a significant torque variation according to the engine operating conditions, for converting a torque variation amount to be caused by the adjustment of the subjective control parameter into an equivalent adjustment amount of a supplementary control parameter non-relevant to the adjustment of the subjective control parameter, and for changing the supplementary control parameter by the equivalent adjustment amount so as to suppress the torque variation amount to be caused.

For example, when a throttle opening degree and an exhaust gas recirculation (EGR) amount are changed to maintain stable combustion condition, the torque variation to be caused by these control parameters is converted into an equivalent adjustment amount of other control parameters, such as fuel amount, ignition timing, etc, which are non-relevant to the adjustment having done by the above control parameters. Then, the non-relevant control parameters are changed so as to cancel the torque variation to be caused by the adjustment having done by the above control parameters. Thus, it becomes possible to suppress undesirable torque variation while maintaining combustion stability. This brings improved drivability of the vehicle.

The first control apparatus can be applied to each of a lean burn engine, an intake port injection engine, and a cylinder injection engine.

When the first control apparatus is employed in the cylinder injection engine, it is preferable that the first control apparatus further comprises combustion mode switching means for selecting either a stratified combustion mode or a homogeneous combustion mode in accordance with the engine operating conditions, so that fuel is directly injected into a cylinder at a compression stroke to cause stratified combustion when the stratified combustion mode is selected and at an intake stroke to cause homogeneous combustion when the homogeneous combustion mode is selected. In this case, the torque variation suppressing means suppresses torque variation responsive to a change of a control parameter adjusted to maintain stable combustion condition before and after switching of the combustion mode by correcting a fuel amount when the stratified combustion mode is selected and by correcting an air amount and/or an ignition timing when the homogeneous combustion mode is selected.

It is further preferable that the torque variation suppressing means of the first control apparatus corrects the requested torque amount when the requested torque amount is converted into the fuel amount in the stratified combustion mode and corrects the requested torque amount when the requested torque amount is converted into the air amount in the homogeneous combustion mode.

Furthermore, the present invention provides a second control apparatus for a cylinder injection type internal combustion engine comprising combustion mode switching means for selecting either a stratified combustion mode or a homogeneous combustion mode in accordance with engine operating conditions, so that fuel is directly injected into a cylinder at a compression stroke to cause stratified combustion when the stratified combustion mode is selected and at an intake stroke to cause homogeneous combustion when the homogeneous combustion mode is selected. The second control apparatus comprises stratified combustion mode controlling means for obtaining a target fuel amount based on an indicated torque request to be generated from the internal combustion engine during the stratified combustion mode as well as based on an engine rotational speed, and for obtaining other control parameter by using the target fuel amount. The second control apparatus further comprises homogeneous combustion mode controlling means for obtaining a target air amount based on an indicated torque request to be generated from the internal combustion engine during the homogeneous combustion mode as well as based on the engine rotational speed, and for obtaining other control parameter by using the target air amount.

According to the second control apparatus, it is preferable that indicated torque request calculating means is provided for calculating the indicated torque request, and each of the stratified combustion mode controlling means and the homogeneous combustion mode controlling means uses the indicated torque request obtained by the indicated torque request calculating means.

Furthermore, according to the second control apparatus, it is preferable that target air-fuel ratio setting means is provided for setting a target air-fuel ratio based on the indicated torque request and the engine rotational speed. The stratified combustion mode controlling means calculates a target air amount and a target throttle opening degree based on the target air-fuel ratio determined by the target air-fuel ratio setting means as well as based on the target fuel amount. And, the homogeneous combustion mode controlling means calculates a target fuel amount based on the target air-fuel ratio determined by the target air-fuel ratio setting means as well as based on a detection value or an estimated value of an actual air amount.

Moreover, in view of the problems of the conventional engine control techniques, the present invention has an object to provide a control apparatus for an internal combustion engine which is capable of performing an excellent torque on demand control assuring good engine response in a vehicle accelerating condition.

To accomplish the above and other related objects, the present invention provides a third control apparatus for an internal combustion engine comprising indicated torque request calculating means for calculating an indicated torque request to be generated from the internal combustion engine for controlling the internal combustion engine based on the indicated torque request. The indicated torque request calculating means calculates the indicated torque request considering a dynamic torque loss caused by an inertial force responsive to a change of engine rotational speed in addition to a static torque loss of the internal combustion engine.

According to the third control apparatus, it is preferable that the indicated torque request calculating means calculates the dynamic torque loss by multiplying an inertial moment of a rotary member rotating in synchronism with a crankshaft of the internal combustion engine with a rotational angular acceleration.

Furthermore, according to the third control apparatus, it is preferable that the indicated torque request calculating means obtains the indicated torque request by adding a requested axle torque, the dynamic torque loss, the static torque loss, and an external load torque of an accessory or the like installed on the internal combustion engine.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF A PREFERRED EMBODIMENT

Figure 1:
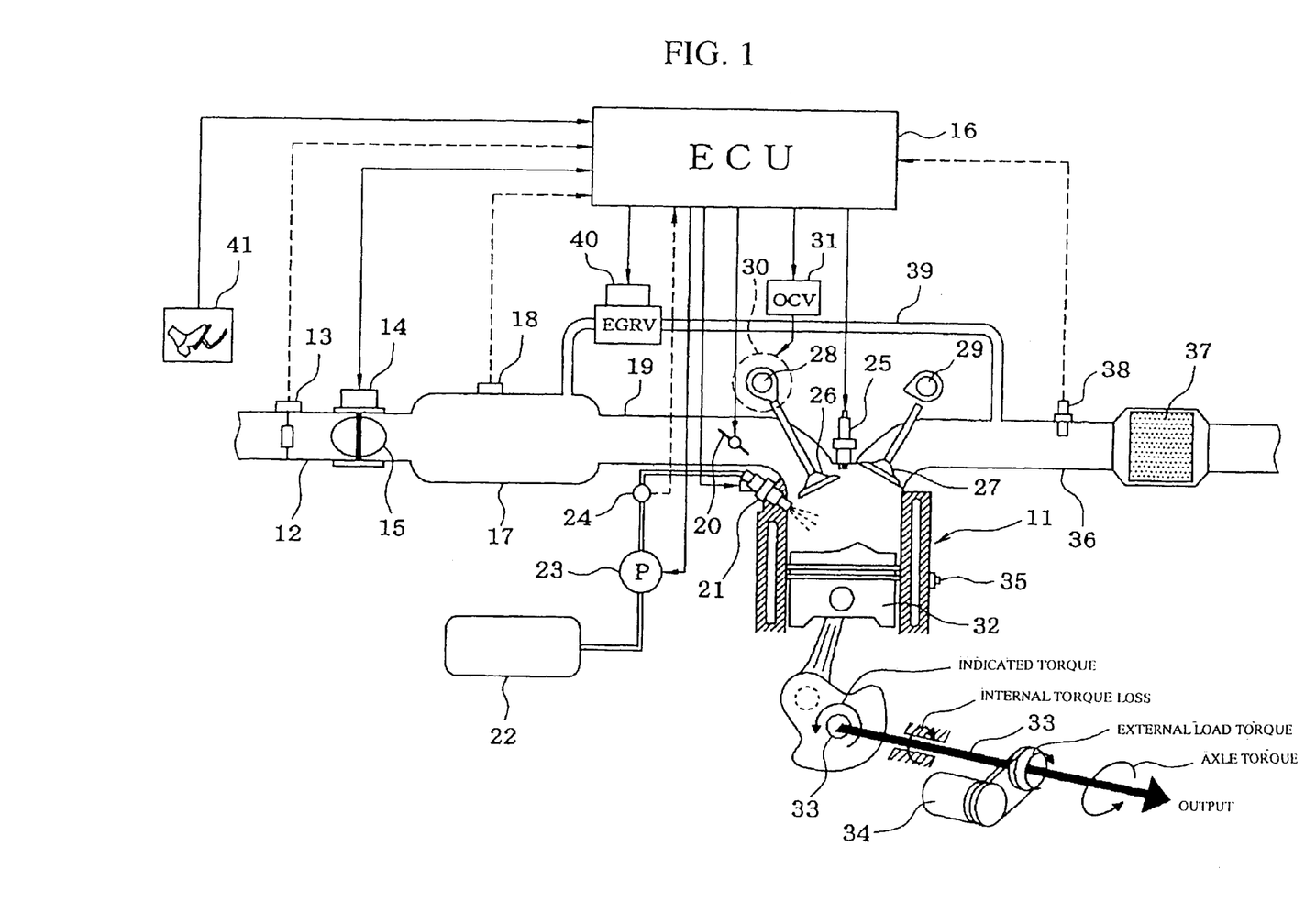
FIG. 1 is a diagram schematically showing an overall arrangement of a control system for a cylinder injection engine in accordance with a preferred embodiment of the present invention.

Hereinafter, a preferred embodiment of the present invention applied to a cylinder (or direct) injection engine will be explained with reference to attached drawings. FIG. 1 is a diagram schematically showing an overall arrangement of an engine control system. An engine 11 is an internal combustion engine of a cylinder injection type. An air cleaner (not shown) is provided at an upstream end of the an, intake pipe 12 of this engine 11. An air flow meter 13 is provided an a downstream side of the air cleaner. A throttle valve 15 is provided at a downstream side of the air flow meter 13. A motor 14, such as a DC motor, is associated with the throttle valve 15 to adjust an opening degree of this throttle valve 15. An electronic engine control circuit (hereinafter, referred to as ECU) 16 supplies a control signal to the motor 14. The motor 14 rotates the throttle valve 15 in accordance with the given control signal so as to adjust the opening degree of the throttle valve 15 (i.e., throttle opening degree) to an intended value. Thus, an intake air amount supplied to each cylinder (i.e., in-cylinder air amount) is adjustable in accordance with the throttle opening degree.

A surge tank 17 is provided at a downstream side of the throttle valve 15. An intake pressure sensor 18, detecting an intake pressure Pm, is attached to the surge tank 17. An intake manifold 19, connected to the surge tank 17, introduces air into each cylinder of the engine 11. A swirl control valve 20, provided in this intake manifold 19, controls swirl flow formed in the cylinder of the engine 11.

A fuel injection valve 21, installed at an upper portion of each cylinder of the engine 11, injects fuel directly into the cylinder. A fuel tank 22 stores fuel therein. A fuel pump 23 pressurizes the fuel supplied from the fuel tank 22 and feeds pressurized fuel to the fuel injection valve 21 of each cylinder. A fuel pressure sensor 24 detects the pressure of pressurized fuel (i.e., fuel pressure). For each cylinder, an ignition plug 25 is installed to a cylinder head of the engine 11. The ignition plug 25 causes spark discharge to fire the air/fuel mixture in each cylinder.

The engine 11 has intake valves 26 and exhaust valves 27 which are driven by cam shafts 28 and 29, respectively. The intake-side cam shaft 28 is engaged with a variable valve timing mechanism 30 of a hydraulic type. The variable valve timing mechanism 30 changes the open and/or close timing of the intake valve 26 in accordance with operating conditions of the engine 11. An oil pressure control valve 31 controls the oil pressure for actuating the variable valve timing mechanism 30. A crank shaft 33 rotates in response to the reciprocative motion of a piston 32 accommodated in each cylinder of the engine 11. A rotational torque of the crank shaft 33 is used to drive an external load 34, such as air-conditioning compressor, alternator, power steering pump or the like, as well as to drive a vehicle drive system. A water temperature sensor 35, detecting the temperature of cooling water, is attached to a cylinder block of the engine 11.

A catalyst 37, such as a ternary catalyst, is provided at an appropriate portion of an exhaust pipe 36 for purifying exhaust gas. An air-fuel ratio sensor 38, provided at an upstream side of this catalyst 37, detects an air-fuel ratio of exhaust gas. An EGR pipe 39, connecting an upstream side of the air-fuel ratio sensor 38 to the surge tank 17, returns or circulates part of exhaust gas from the exhaust pipe 36 to the intake side. An EGR valve 40, provided at an intermediate portion of this EGR pipe 39, controls an exhaust gas recirculation amount (i.e., EGR amount).

Figure 2:
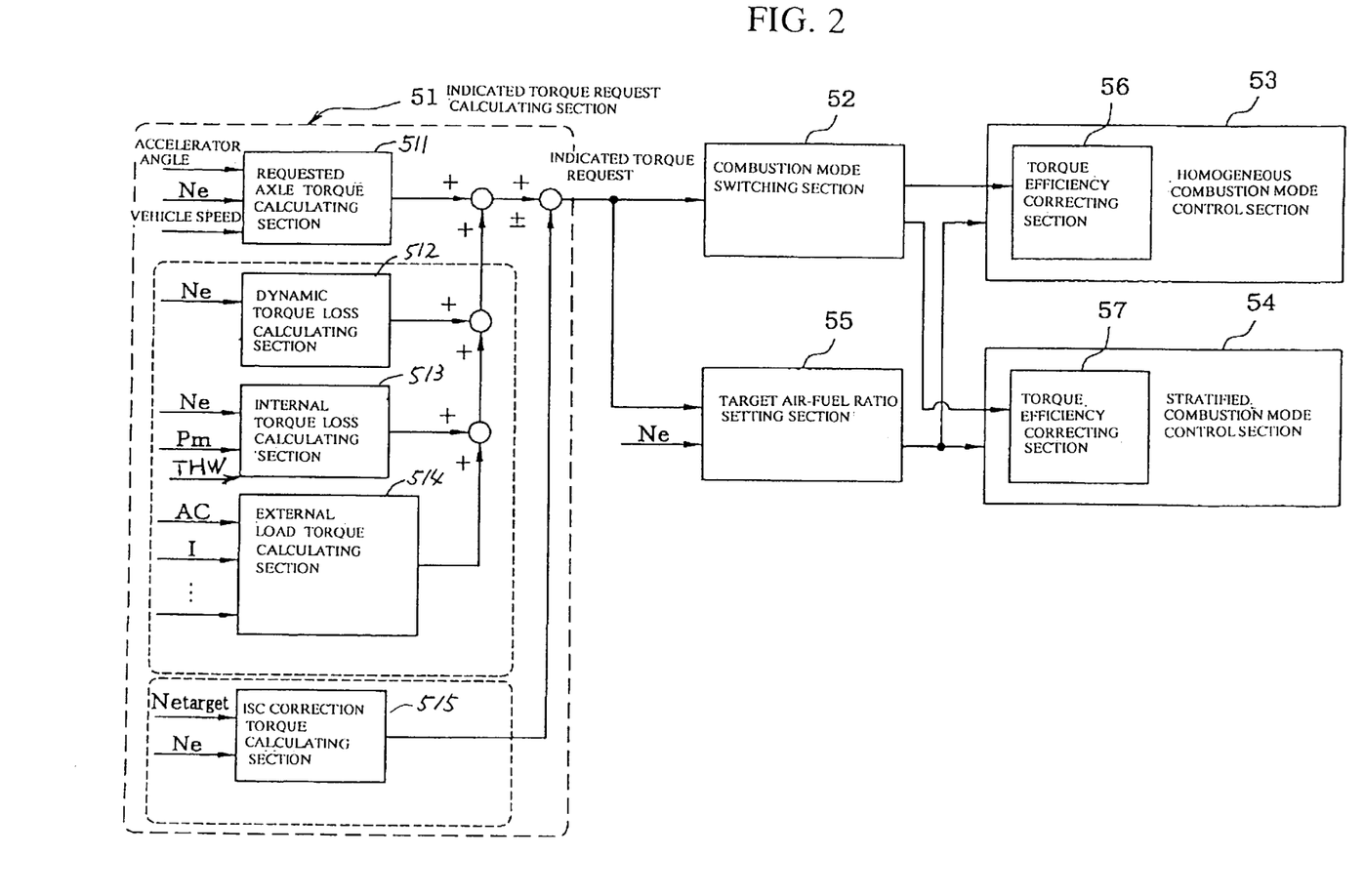
FIG. 2 is a block diagram schematically showing a torque on demand control for the cylinder injection engine in accordance with the preferred embodiment of the present invention.

ECU 16, controlling engine operating conditions, chiefly consists of a microcomputer incorporating a ROM (recording medium) storing a torque on demand control program. FIG. 2 shows functional features of the ECU 16 realized by executing the torque on demand control program. As shown in FIG. 2, ECU 16 comprises an indicated torque request calculating section 51, a combustion mode switching section 52, a homogeneous combustion mode control section 53, a stratified combustion mode control section 54, and a target air-fuel ratio setting section 55. Hereinafter, functions of respective sections 51-55 will be explained in more detail.

The indicated torque request calculating section 51 calculates an indicated torque request based on an output signal of an accelerator sensor 41 (refer to FIG. 1) which detects a depression angle of an accelerator pedal (i.e., accelerator angle).

The indicated torque request is a request value (i.e., target value) of the indicated torque. The indicated torque is a torque to be generated by combustion of the engine 11, i.e., a torque including dynamic torque loss, internal torque loss and external load torque (such as accessory load or the like). Accordingly, an axle torque (i.e., net torque) taken out from the crank shaft 33 is a difference obtained by subtracting the dynamic torque loss, the internal torque loss (i.e., static torque loss) and external load torque from the indicated torque. The axle torque is available for the vehicle drive system.

More specifically, the indicated torque request calculating section 51 comprises a requested axle torque calculating section 511, a dynamic torque loss calculating section 512, an internal torque loss calculating section 513, an external load torque calculating section 514 and an ISC correction torque calculating section 515.

The requested axle torque calculating section 511 calculates a requested axle torque based on the output signal (i.e., accelerator angle) of the accelerator sensor 41, engine rotational speed Ne, vehicle speed or the like, with reference to a prepared map. It is however possible to calculate the requested axle torque based on the accelerator opening degree and the engine rotational speed Ne. The requested axle torque is added to later-described various torque losses and is then corrected by considering a torque variation (i.e., torque increase/decrease amount) caused by an idle speed control (i.e., ISC), thereby obtaining the indicated torque request. More specifically, the dynamic torque loss calculating section 512 calculates a dynamic torque loss caused by an inertial force responsive to the change of engine rotational speed or the like. Hereinafter, a method for calculating the dynamic torque loss will be explained with reference to FIG. 3. First, the engine rotational speed Ne (rpm) is multiplied with $2\pi/60$ to obtain a rotational angular speed $\omega e$ (i.e., $\omega e = Ne \times 2\pi/60$). Then, the dynamic torque loss calculating section 512 obtains a rotational angular acceleration $\omega e/dt$ by applying time differential processing to the rotational angular speed $\omega e$. The rotational angular acceleration $d\omega e/dt$ is then multiplied with an inertial moment Ie of a rotational inertial system to obtain a dynamic torque loss $Ie \cdot d\omega e/dt$.

Figure 3:
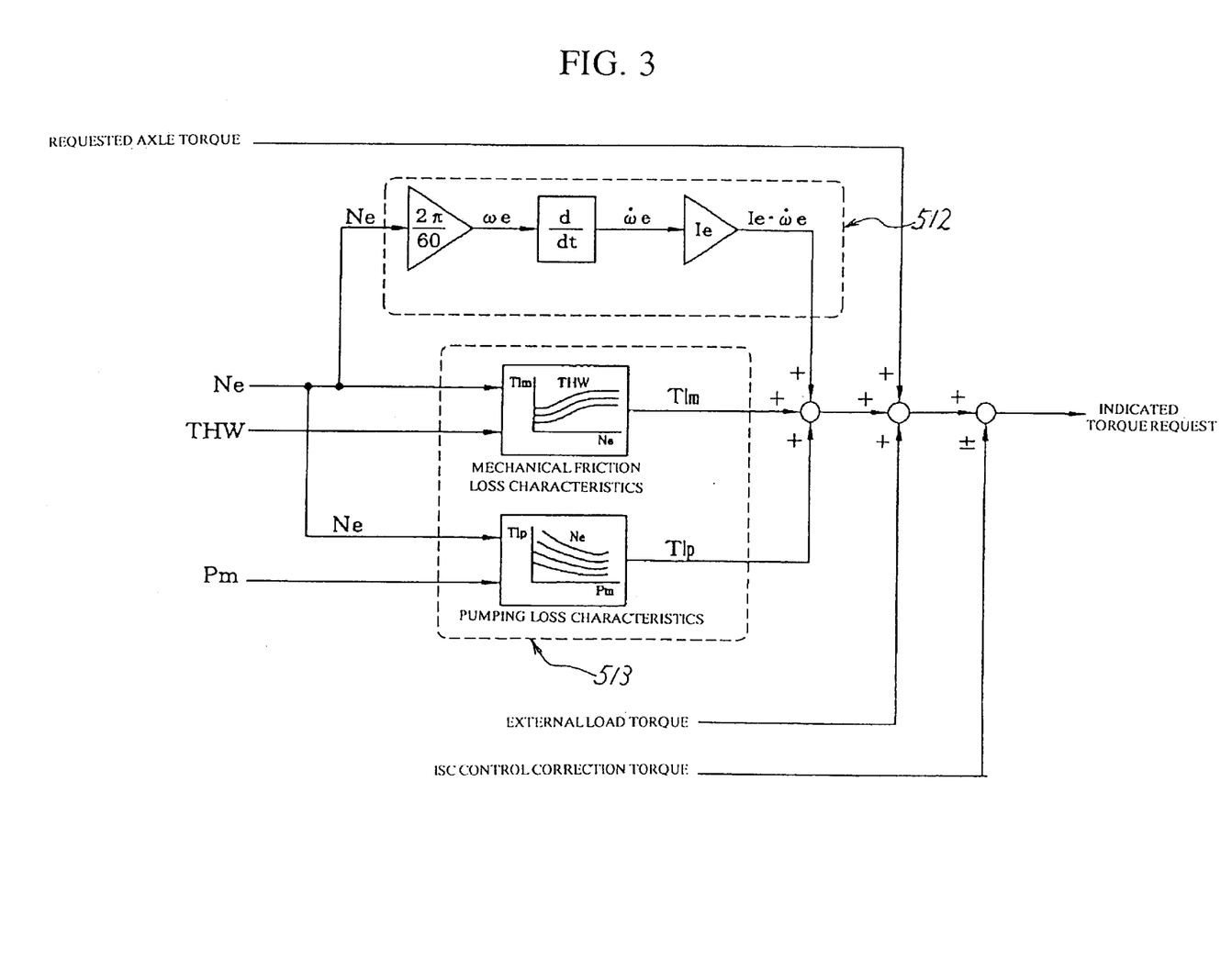
FIG. 3 is a block diagram showing details of dynamic torque loss calculation and internal torque loss calculation in accordance with the preferred embodiment of the present invention.

The inertial moment Ie is generally caused by the inertia of rotary members, such as a flywheel of the engine 11 rotating in synchronism with the piston 32, the crank mechanism, and the crank shaft 33 in the case of a manual transmission vehicle or an impeller of a torque converter connected to the engine output shaft in the case of an automatic transmission vehicle. The inertial moment Ie is a constant value not influenced by the rotational speed change. Therefore, it is desirable to calculate the inertial moment Ie based on practical shape/density (specific gravity) data of the rotary inertial members, and store the calculated value in ROM of ECU 16 beforehand.

It is also preferable to prepare a map of dynamic torque loss with a parameter of the rotational angular acceleration $d\omega e/dt$ and store this map in ROM of ECU 16 beforehand. The dynamic torque loss $Ie \cdot d\omega e/dt$ corresponding to an arbitrary value of rotational angular acceleration $d\omega e/dt$ can be obtained with reference to this map.

The internal toque loss to be added to the requested axle torque includes mechanical friction loss Tlm and pumping loss Tlp as shown in FIG. 3. The mechanical friction loss of the engine 11 is dependent on viscosity of lubrication oil which varies in accordance with temperature change and also dependent on the engine speed. To calculate the mechanical friction loss Tlm, the internal torque loss calculating section 513 calculates the mechanical friction loss Tlm corresponding to present data of the engine rotational speed Ne and the cooling water temperature THW with reference to a two-dimensional map representing mechanical friction loss characteristics. In this case, instead of using the cooling water temperature THW, it is possible to use an oil temperature to evaluate the viscosity of lubrication oil.

The pumping loss is dependent on the intake pressure Pm and the engine speed Ne. To calculate the the pumping loss Tlp, the internal torque loss calculating section 513 calculates the pumping loss Tlp corresponding to present data of the engine rotational speed Ne and the intake pressure Pm with reference to a two-dimensional map representing pumping loss characteristics.

Furthermore, the external load torque to be added to the requested axle torque are load torques of accessories (i.e., air-conditioning compressor, alternator, power steering pump or the like) driven by the power of engine 11.

Figure 4:
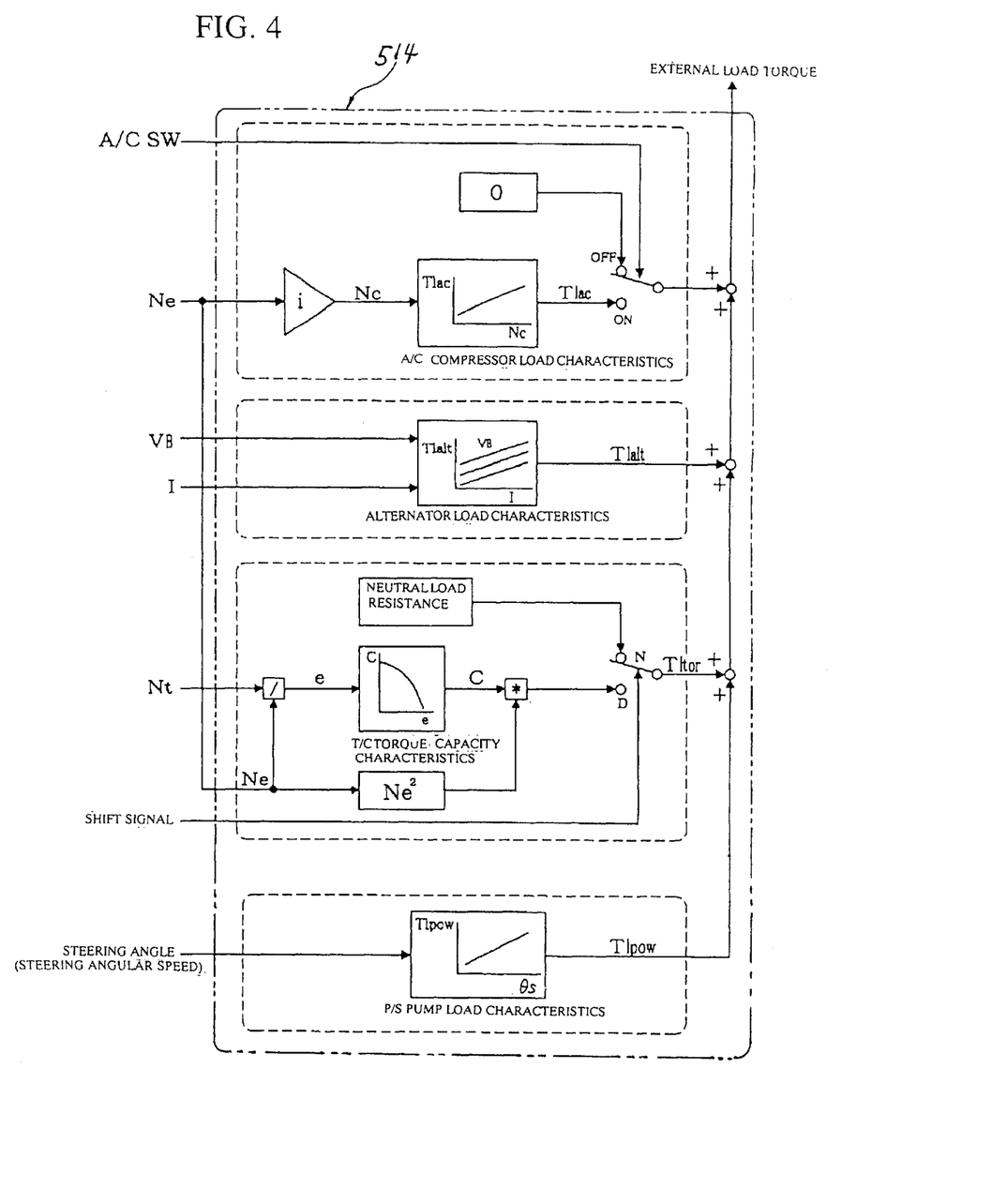
FIG. 4 is a block diagram showing details of external load torque calculation in accordance with the preferred embodiment of the present invention.

Hereinafter, the external load torque calculating section 514 will be explained with reference to FIG. 4. The external load torque calculating section 514 calculates a load torque of external load (=accessories) 34, such as air-conditioning compressor (i.e., A/C compressor), alternator, power steering pump or the like.

More specifically, to calculate an A/C compressor load torque Tlac, the external load torque calculating section 514 reads an on-off signal (A/C SW) of an air-conditioning switch. When the A/C SW is off, A/C compressor load torque Tlac is set to 0. When the A/C SW is on, the engine rotational speed Ne is multiplied with a pulley ratio to calculate a compressor rotational speed Nc. Then, the external load torque calculating section 514 calculates A/C compressor load torque Tlac corresponding to the compressor rotational speed Nc with reference to a two-dimensional map representing A/C compressor load characteristics.

To calculate an alternator load torque Tlalt, the external load torque calculating section 514 reads a battery voltage VB and field current I of the alternator. Then, the external load torque calculating section 514 calculates alternator load torque Tlalt corresponding to the battery voltage VB and field current I with reference to a two-dimensional map representing alternator load characteristics.

To calculate a torque convertor load torque Tltor, the external load torque calculating section 514 reads a turbine rotational speed Nt of the torque convertor (i.e., T/C) and a shift signal of the transmission. When the shift position is a N range (i.e., neutral position), the torque convertor load torque Tltor is set to a neutral load resistance (=a fixed value). When the shift position is a D range (i.e., drive position), the turbine rotational speed Nt is divided by the engine rotational speed Ne to obtain a slip rate "e." Then, the external load torque calculating section 514 calculates a torque capacity "C" corresponding to the slip rate "e" with reference to a two-dimensional map representing a T/C torque capacity characteristics. Subsequently, the torque capacity "C" is multiplied with $Ne^2$ to obtain a D-range load resistance which is output as the torque convertor load torque Tltor.

To calculate a P/S pump load torque Tlpow of the power steering device (P/S), the external load torque calculating section 514 reads a steering angle amount (i.e., steering angular speed $\theta s$) and calculates a corresponding P/S pump load torque Tlpow with reference to a two-dimensional map representing P/S pump load characteristics.

The external load torque calculating section 514 adds the A/C compressor load torque Tlac, the alternator load torque Tlalt, the torque convertor load torque Tltor, and the P/S pump load torque Tlpow, thereby finally outputting the external load torque. In the above-described calculation of each load torque, it is possible to use a formula instead of using a map.

The ISC correction torque calculating section 515 calculates an torque variation caused by the idle speed control (i.e., ISC) as an ISC correction torque. The idle speed control is a PID or comparable feedback control for equalizing the engine rotational speed Ne with the target idle rotational speed Netarget based on a difference between the target idle rotational speed Netarget and the engine rotational speed Ne.

Finally, after adding the dynamic torque loss ($=Ie \cdot d\omega e/dt$), the static torque loss ($=Tlm+Tlp$) and the external load torque to the requested axle torque, the indicated torque request calculating section 51 corrects the requested axle torque by considering the torque variation (i.e., torque increase/decrease amount) caused by the idle speed control (i.e., ISC), thereby obtaining the indicated torque request.

The target air-fuel ratio setting section 55 sets a target air-fuel ratio (i.e., target A/F) based on the indicated torque request calculated by the indicated torque request calculating section 51 and also based on the engine rotational speed Ne with reference to a prepared map or according to a predetermined formula. The target air-fuel ratio is a common value used in both the homogeneous combustion mode control section 53 and the stratified combustion mode control section 54.

To switch the combustion mode, the combustion mode switching section 52 selects either the homogeneous combustion mode control section 53 or the stratified combustion mode control section 54 based on the engine rotational speed Ne and the indicated torque request with reference to a prepared map or the like. For example, the combustion mode switching section 52 selects the stratified combustion mode control section 54 in low speed and/or low torque engine operation conditions, so that the engine 11 can operate according to the stratified combustion mode. When the stratified combustion mode is selected, a relatively small amount of fuel is directly injected into the cylinder during a compression stroke of the engine 11 so as to form a stratified mixture in the cylinder for the stratified combustion. The stratified combustion mode can improve fuel economy. On the other hand, the combustion mode switching section 52 selects the homogeneous combustion mode control section 53 in middle-high speed and/or middle-high torque engine operation conditions, so that the engine 11 can operate according to the homogeneous combustion mode. When the homogeneous combustion mode is selected, an increased amount of fuel is directly injected into the cylinder during an intake stroke of the engine 11 so as to form a uniform or homogeneous mixture in the cylinder for realizing the uniform or homogeneous combustion. The homogeneous combustion mode can increase engine output power as well as axle torque of the engine.

Figure 5A:
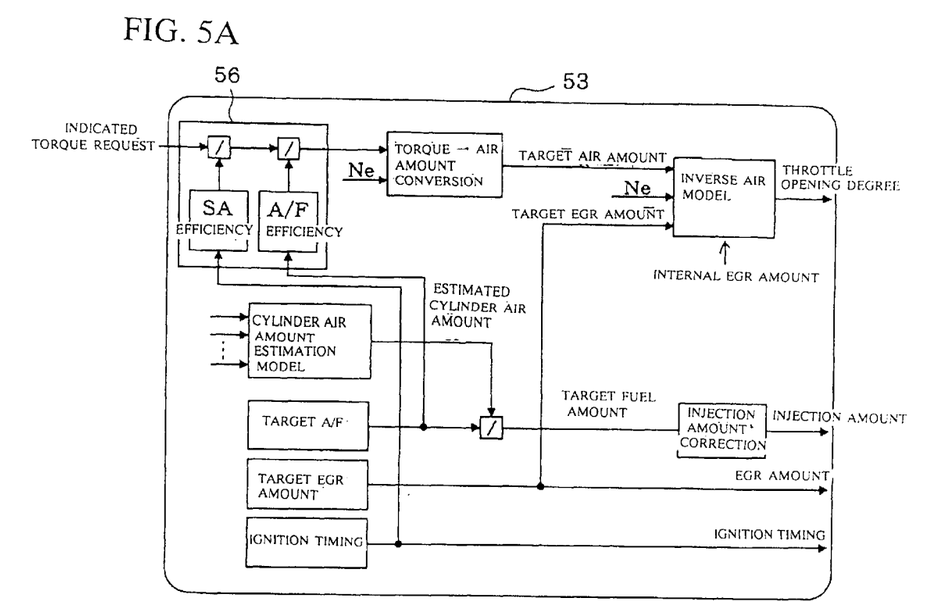
FIG. 5A is a block diagram showing functions of a homogeneous combustion mode control performed in accordance with the preferred embodiment of the present invention.

Next, detailed functions of the homogeneous combustion mode control section 53 will be explained with reference to FIG. 5A. The homogeneous combustion mode control section 53 comprises a torque efficiency correcting section 56 (corresponding to a torque variation suppressing means) which suppresses torque variation responsive to the switching of combustion mode. The indicated torque request produced from the torque efficiency correcting section 56 is converted into a target air amount. The throttle opening degree is adjusted according to the target air amount. This is referred to as torque on demand control of air prioritized type. The torque efficiency correcting section 56 corrects the indicated torque request based on ignition timing efficiency (i.e., SA efficiency) and air-fuel ratio efficiency (A/F efficiency) with reference to the following formula, considering a torque variation responsive to control parameters (e.g., ignition timing, air-fuel ratio in the cylinder, etc.) to be adjusted to maintain stable combustion conditions before and after the switching of combustion mode.

Indicated Torque Request (After Correction)=Indicated Torque Request/(Ignition Timing Efficiency×Air-fuel Ratio Efficiency)

Figure 6:
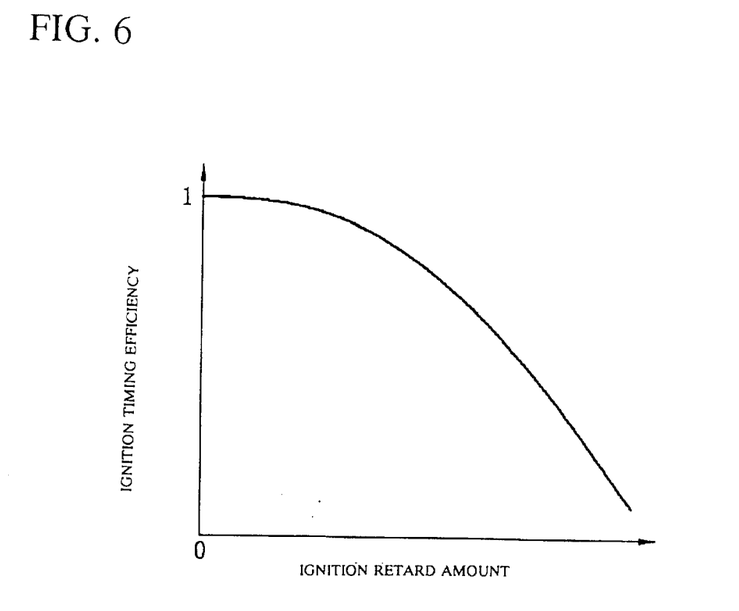
FIG. 6 is a graph showing one example of a map used for determining an ignition timing efficiency in relation to a parameter of an ignition timing retard amount in accordance with the preferred embodiment of the present invention.

The ignition timing efficiency is a nondimensional parameter evaluating influence of the ignition retard amount on the indicated torque. FIG. 6 shows a setting of the ignition timing efficiency in relation to the ignition retard amount. The indicated torque is maximized when the ignition retard amount is 0. Considering this fact, the ignition timing efficiency is set to 1 when the ignition retard amount is 0. In other words, the ignition timing efficiency is the indicated torque expressed by "1" at the ignition retard amount =0. The ignition timing efficiency corresponding to other ignition retard amount is the indicated torque expressed by a relative value, with respect to the reference value "1."

Figure 7:
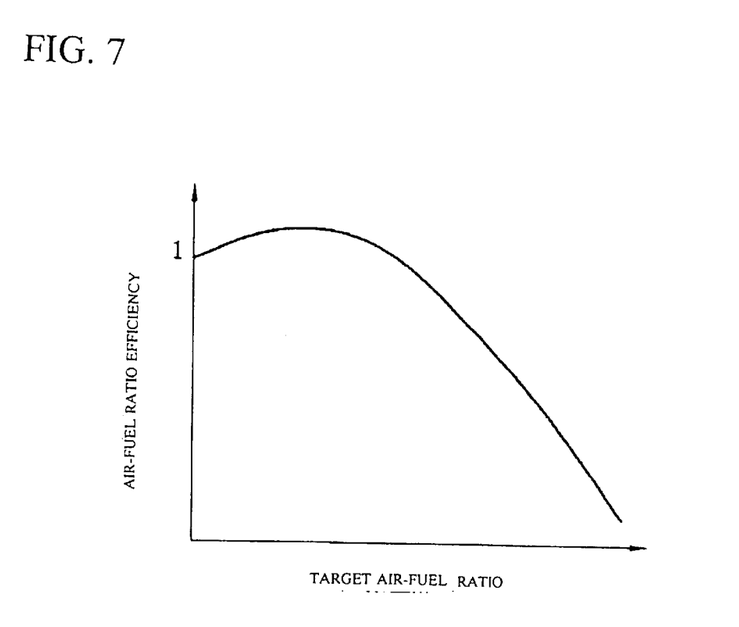
FIG. 7 is a graph showing one example of a map used for determining an air-fuel ratio efficiency in relation to a parameter of a target air-fuel ratio in accordance with the preferred embodiment of the present invention.

The air-fuel ratio efficiency is a nondimensional parameter evaluating influence of the air-fuel ratio in the cylinder on the indicated toque. FIG. 7 shows a setting of the air-fuel ratio efficiency in relation to the target air-fuel ratio. In other words, the air-fuel ratio efficiency is the indicated torque expressed by "1" at the standard air-fuel ratio. The air-fuel ratio efficiency corresponding to other target air-fuel ratio is the indicated torque expressed by a relative value with respect to the reference value "1." The data of FIGS. 6 and 7 for setting the ignition timing efficiency and the air-fuel ratio efficiency are obtained beforehand through experiments and simulations and are stored as maps in ROM of ECU 16.

The homogeneous combustion mode control section 53 calculates the target air amount based on the indicated torque request produced from the torque efficiency correcting section 56 and the engine rotational speed Ne with reference to a prepared map or the like. Then, the homogeneous combustion mode control section 53 calculates a command value for the throttle opening degree by using an inverse air model based on the target air amount, engine rotational speed Ne, target EGR amount, and internal EGR amount (i.e., advance angle of variable valve timing mechanism 30). The inverse air model is obtained by inversely solving the input/output relationship of an air model simulating the air flow in the intake passage extending from the throttle valve 15 to the intake port. The command value for the throttle opening degree calculated by the inverse air model is converted into a corresponding control signal which is supplied to the motor 14 of the electronic throttle system. The motor 14 controls the opening degree of the throttle valve 15 in accordance with the control signal.

Furthermore, the homogeneous combustion mode control section 53 calculates a target fuel amount which is obtained by dividing an estimated in-cylinder air amount (or actual air amount) by the target air-fuel ratio. The target fuel amount is multiplied with various correction coefficients (e.g., water temperature correction coefficient, feedback correction coefficient, learning correction coefficient, etc.) to obtain a final fuel injection amount. The obtained fuel injection amount determines a pulse width of an injection pulse which is supplied to the fuel injection valve 21 of each cylinder to inject the designated amount of fuel into the cylinder at the intake stroke. In this manner, when the engine 11 is in the homogeneous combustion mode, fuel is directly injected into the cylinder at the intake stroke to form a uniform or homogeneous mixture in the cylinder, thereby realizing the uniform or homogeneous combustion.

Furthermore, the homogeneous combustion mode control section 53 calculates the target EGR amount based on engine driving conditions with reference to a prepared map or the like, and then controls the EGR valve 40 to adjust an actual EGR amount to the target EGR amount. It is however possible to set the target EGR amount at a portion other than the homogeneous combustion mode control section 53, so that the target EGR amount can be commonly used by the homogeneous combustion mode control section 53 and the stratified combustion mode control section 54.

Furthermore, the homogeneous combustion mode control section 53 calculates an ignition timing of each cylinder based on engine driving conditions with reference to a prepared map or the like, and then applies a high voltage to the ignition plug 25 at the calculated ignition timing to cause spark discharge. A retard amount of this ignition timing can be used to calculate the above-described ignition timing efficiency with reference to the map of FIG. 6.

Next, detailed functions of the stratified combustion mode control section 54 will be explained with reference to FIG. 5A. The stratified combustion mode control section 54 comprises a torque efficiency correcting section 57 (corresponding to the torque variation suppressing means) which suppresses torque variation responsive to the switching of combustion mode. The indicated torque request produced from the torque efficiency correcting section 57 is converted into a target fuel amount. The target fuel amount is multiplied with the target air-fuel ratio to obtain a target air amount. The throttle opening degree is adjusted according to the target air amount. This is referred to as torque on demand control of fuel prioritized type. The torque efficiency correcting section 57 corrects the indicated torque request based on the air-fuel ratio efficiency with reference to the following formula, considering a torque variation responsive to control parameters (e.g., air-fuel ratio in the, cylinder, etc.) to be adjusted to maintain stable combustion conditions before and after the switching of combustion mode.

Indicated Torque Request (After Correction)=Indicated Torque Request/Air-fuel Ratio Efficiency The calculation method for the air-fuel ratio efficiency is identical with that explained for the homogeneous combustion mode control section 53. Namely, the air-fuel ratio efficiency is dependent on the target air-fuel ratio and calculated with reference to the map shown in FIG. 7. By the way, according to the stratified combustion mode, only a very narrow region of ignition timing can assure stable combustion. Accordingly, performing the retard correction for the ignition timing is undesirable since it may induce a torque variation. This is why the ignition timing efficiency is not taken into consideration for the stratified combustion mode, unlike the homogeneous combustion mode.

Figure 5B:
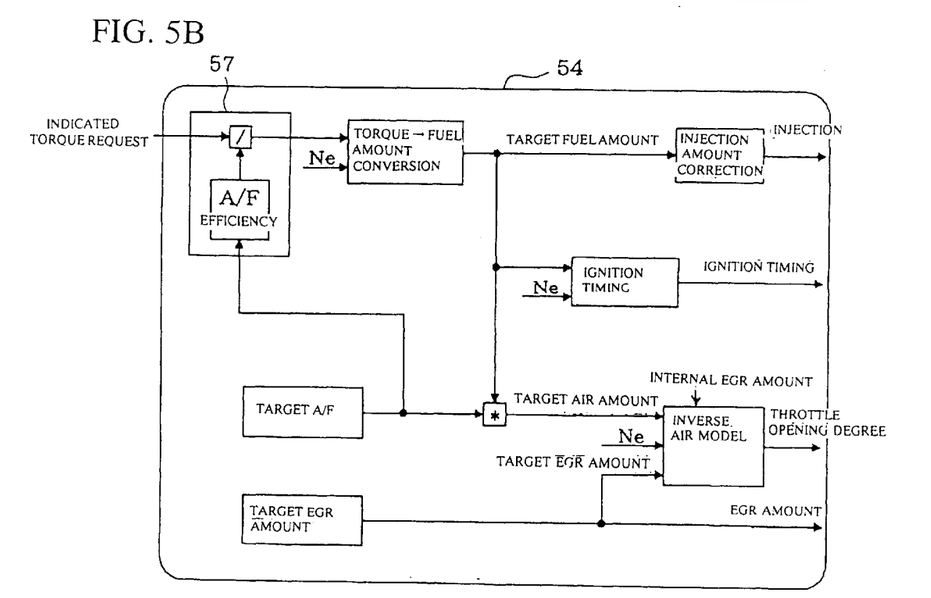
FIG. 5B is a block diagram showing functions of a stratified combustion mode control performed in accordance with the preferred embodiment of the present invention.

The stratified combustion mode control section 54 calculates a target fuel amount based on the indicated torque request produced from the torque efficiency correcting section 57 and the engine rotational speed Ne with reference to a prepared map or the like. The target fuel amount is multiplied with various correction coefficients (e.g., water temperature correction coefficient, feedback correction coefficient, learning correction coefficient, etc.) to obtain a final fuel injection amount. The obtained fuel injection amount determines a pulse width of an injection pulse which is supplied to the fuel injection valve 21 of each cylinder to inject the designated amount of fuel into the cylinder at the compression stroke. In this manner, when the engine 11 is in the stratified combustion mode, fuel is directly injected into the cylinder at the compression stroke to form a stratified mixture in the cylinder, thereby realizing the stratified combustion.

Furthermore, the stratified combustion mode control section 54 calculates an ignition timing of each cylinder based on the target fuel amount and the engine rotational speed Ne with reference to a prepared map or the like, and then applies a high voltage to the ignition plug 25 at the calculated ignition timing to cause spark discharge.

Furthermore, the stratified combustion mode control section 54 multiples the target fuel amount with the target air-fuel ratio to obtain a target air amount. Then, the stratified combustion mode control section 54 calculates a command value for the throttle opening degree by using an inverse air model based on the target air amount, engine rotational speed Ne, target EGR amount, and internal EGR amount (i.e., advance angle of variable valve timing mechanism 30). The command value for the throttle opening degree is then converted into a corresponding control signal which is supplied to the motor 14 of the electronic throttle system. The motor 14 controls the opening degree of the throttle valve 15 in accordance with the control signal. Furthermore, the stratified combustion mode control section 54 actuates the EGR valve 40 to adjust an actual EGR amount to a given target EGR amount.

Figure 8:
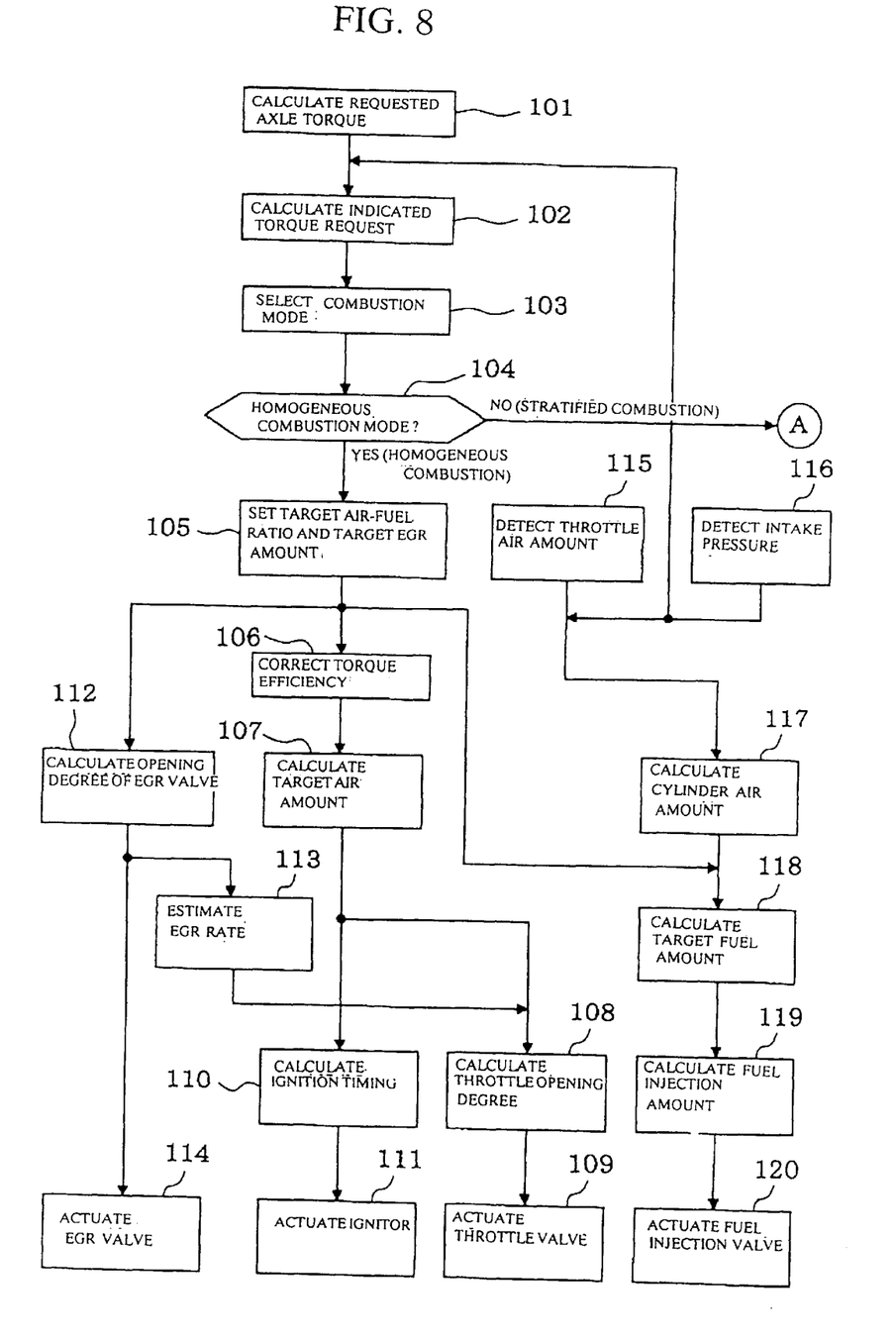
FIG. 8 is a flowchart (part I) schematically explaining the torque on demand control for the cylinder injection engine in accordance with the preferred embodiment of the present invention.
Figure 9:
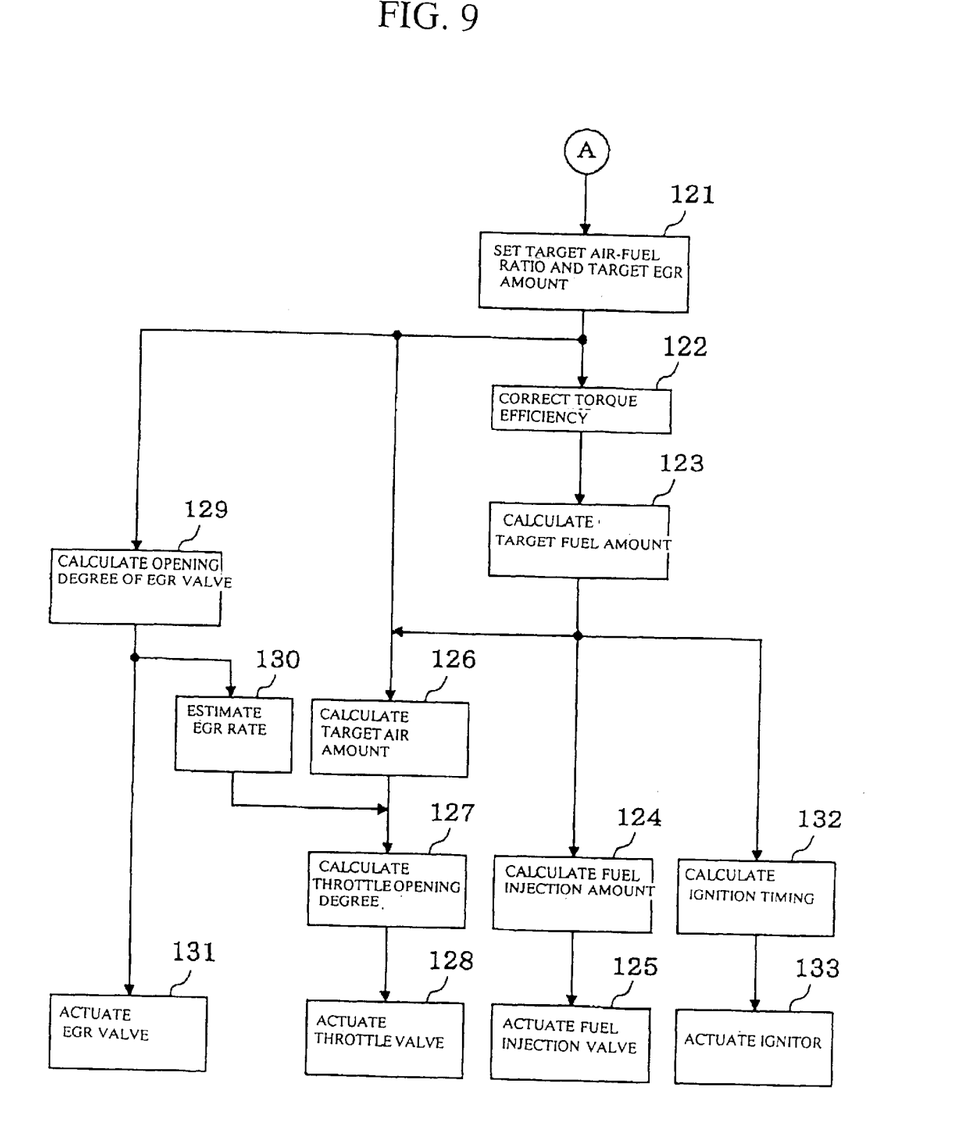
FIG. 9 is a flowchart (part II) schematically explaining the torque on demand control for the cylinder injection engine in accordance with the preferred embodiment of the present invention.

FIGS. 8 and 9 are flowcharts showing the control procedure of ECU 16 which performs the above-described torque on demand control for the cylinder injection engine 11. First in step 101, ECU 16 calculates the requested axle torque based on the output signal (i.e., accelerator angle) of the accelerator sensor 41, engine rotational speed Ne, vehicle speed or the like. In the next step 102, CPU 16 adds the calculated requested axle torque to the internal torque loss (e.g., mechanical friction loss and pumping loss) and the external load torque. Then, CPU 16 corrects the summed-up value by a torque amount to be consumed by the ISC control, thereby obtaining the indicated torque request. Subsequently, CPU 16 proceeds to step 103 to select either the homogeneous combustion mode or the stratified combustion mode based on the indicated torque request and the engine rotational speed Ne with reference to a prepared map or the like.

When the homogeneous combustion mode is selected, CPU 16 proceeds to step 105 via step 104. In step 105, CPU 16 determines the target air-fuel ratio based 10 on the indicated torque request obtained in the step 102 and the engine rotational speed Ne with reference to a prepared map or the like. Furthermore, CPU 16 determines the target EGR amount according to the engine operating conditions. Then, CPU 16 proceeds to step 106 to correct the indicated torque request obtained in the step 102 based on both the ignition timing efficiency and the air-fuel ratio efficiency according to the following formula.

Indicated Torque Request (After Correction)=Indicated Torque Request/(Ignition Timing Efficiency×Air-fuel Ratio Efficiency)

Subsequently, CPU 16 proceeds to step 107 to calculate the target air amount based on the indicated torque request (after correction) and the engine rotational speed Ne with reference to a prepared map or the like. Then, in step 108, CPU 16 calculates the command value for the throttle opening degree by using the inverse air model based on the target air amount, engine rotational speed Ne, EGR rate, etc. Furthermore, in step 109, CPU 16 feeds the control signal representing the calculated command value for the throttle opening degree to the motor 14 of the electronic throttle system. The motor 14 controls the opening degree of the throttle valve 15 in accordance with the control signal.

Furthermore, CPU 16 performs the ignition timing control for the engine 11 which is in the homogeneous combustion control mode. To this end, in step 110, CPU 16 calculates the ignition timing according to engine operating conditions with reference to a prepared map or the like. Then, in step 111, CPU 16 actuates an ignitor (not shown) in synchronism with the calculated ignition timing to ignite the uniform or homogeneous mixture in the engine cylinder. Furthermore, in step 112, CPU 16 calculates a target opening degree of EGR valve 40 in accordance with the target EGR amount. Then, in step 113, CPU 16 estimates an EGR rate. The estimated EGR rate is utilized in the calculation of the throttle opening degree performed in the step 108. Next, in step 114, CPU 16 actuates the EGR valve 40 so as to reach the target opening degree, thereby equalizing an actual EGR amount to the target EGR amount.

During the homogeneous combustion mode, at steps 115 and 116, CPU 16 reads an output of the air flow meter 13 (i.e., air flow amount passing by the throttle) and an output of the intake pressure sensor 18 (i.e., intake pressure Pm) to detect both the air flow amount passing by the throttle 15 and the intake pressure Pm. The detected intake pressure Pm is used to calculate the pumping loss which is required in the step 102 to obtain the indicated torque request. The pumping loss can be calculated based on the intake pressure Pm and the engine rotational speed Ne with reference to a prepared map or according to a predetermined formula.

After detecting the air flow amount passing by the throttle 15 and the intake pressure Pm, CPU proceeds to step 117 to calculate an estimated cylinder air amount by using a cylinder air amount estimation model based on the air flow amount passing by the throttle 15, intake pressure Pm, and engine speed Ne. In the next step 118, CPU 16 calculates the target fuel amount by dividing the estimated in-cylinder air amount by the target air-fuel ratio. Then, in step 119, CPU 16 calculates the final fuel injection amount by multiplying the target fuel amount with the various correction coefficients (e.g., water temperature correction coefficient, feedback correction coefficient, learning correction coefficient, etc.). Thereafter, in step 120, CPU 16 feeds the injection pulse having a pulse width corresponding to the final fuel injection amount to the fuel injection valve 21 of each cylinder to inject the designated amount of fuel into the cylinder at the intake stroke. Through the above-described control procedure, CPU 16 operates the engine 11 according to the homogeneous combustion mode in which fuel is directly injected into the cylinder at the intake stroke to form a uniform or homogeneous mixture in the cylinder so as to realize the uniform or homogeneous combustion.

On the other hand, when the stratified combustion mode is selected, CPU 16 proceeds from step 104 to step 121 shown in FIG. 9. In step 121, CPU 16 determines the target air-fuel ratio based on the indicated torque request obtained in the step 102 and the engine rotational speed Ne with reference to a prepared map or the like. Furthermore, CPU 16 determines the target EGR amount according to the engine operating conditions. Then, CPU 16 proceeds to step 122 to correct the indicated torque request obtained in the step 102 based on the air-fuel ratio efficiency according to the following formula.

Indicated Torque Request (After Correction)=Indicated Torque Request/Air-fuel Ratio Efficiency Subsequently, CPU 16 proceeds to step 123 to calculate the target fuel amount based on the indicated torque request (after correction) and the engine rotational speed Ne with reference to a prepared map or the like. Then, in step 124, CPU 16 calculates the final fuel injection amount by multiplying the target fuel amount with the various correction coefficients (e.g., water temperature correction coefficient, feedback correction coefficient, learning correction coefficient, etc.). Thereafter, in step 125, CPU 16 feeds the injection pulse having a pulse width corresponding to the final fuel injection amount to the fuel injection valve 21 of each cylinder to inject the designated amount of fuel into the cylinder at the compression stroke. Through the above-described control procedure, CPU 16 operates the engine 11 according to the stratified combustion mode in which fuel is directly injected into the cylinder at the compression stroke to form a stratified mixture in the cylinder so as to realize the stratified combustion.

Furthermore, according to the stratified combustion mode, CPU 16 obtains the target air amount by multiplying the target air-fuel ratio with the target fuel amount (step 126) and calculates the command value for the throttle opening degree by using the inverse air model based on the target air amount, engine rotational speed Ne, etc (step 127). Furthermore, CPU 16 feeds the control signal representing the calculated command value for the throttle opening degree to the motor 14 of the electronic throttle system. The motor 14 controls the opening degree of the throttle valve 15 in accordance with the control signal (step 128). Moreover, in step 129, CPU 16 calculates a target opening degree of EGR valve 40 in accordance with the target EGR amount. Then, in step 130, CPU 16 estimates an EGR rate. The estimated EGR rate is utilized in the calculation of the throttle opening degree performed in the step 127. Next, in step 131, CPU 16 actuates the EGR valve 40 so as to reach the target opening degree, thereby equalizing an actual EGR amount to the target EGR amount. Furthermore, in step 132, CPU 16 calculates the ignition timing according to engine operating conditions with reference to a prepared map or the like. Then, in step 133, CPU 16 actuates the ignitor (not shown) in synchronism with the calculated ignition timing to ignite the stratified mixture in the engine cylinder.

As explained above, the control system for the cylinder injection engine 11 of this embodiment considers the torque variation responsive to control parameters (e.g., at least throttle opening degree and EGR amount) to be adjusted to maintain stable combustion conditions before and after the switching of combustion mode. To this end, in the stratified combustion mode, the target fuel amount is corrected so as to suppress the torque variation (steps 122 and 123). In the homogeneous combustion mode, the target air amount is corrected so as to suppress the torque variation (steps 106 and 107). Thus, it becomes possible to suppress the torque variation while maintaining combustion stability and also it becomes possible to improve the drivability.

In general, the homogeneous combustion mode assures stable combustion in a relatively wide region of ignition timing. Thus, correction of the ignition timing can be used for suppressing the torque variation. The ignition timing correction is excellent in its response speed compared with the air amount correction. Accordingly, using the ignition timing correction is effective to adequately suppress the torque variation at a situation where the air amount correction cannot respond quickly.

According to this embodiment, the indicated torque request is corrected based on the torque efficiency (i.e., air-fuel ratio efficiency, ignition timing efficiency) so as to substantially correct the target air amount and the target fuel amount. However, instead of correcting the indicated torque request based on the torque efficiency, it is possible to directly correct the target air amount and the target fuel amount in accordance with the torque efficiency after the target air amount and the target fuel amount are calculated.

Furthermore, the present invention is not limited to the cylinder injection engine and, therefore, can be applied to the lean burn engine or the intake port injection engine. For example, when the present invention is applied to the lean burn engine, it becomes possible to suppress torque variation occurring at the switching between the lean burn operation and the stoichiometric/rich operation. Furthermore, when the present invention is applied to the intake port injection engine, it becomes possible to suppress torque variation occurring at the switching between a specific ignition timing control for the purpose of catalyst warmup or else and the ordinary ignition timing control. In short, the present invention can be embodied in any type of engines. When a subjective control parameter causing significant torque variation is changed according to the engine operating conditions, the torque variation amount to be caused by the adjustment of this control parameter is converted into a change amount of a supplementary control parameter non-relevant to the subjective control, parameter. The supplementary control parameter is controlled so as to cancel the torque variation caused by the change of the subjective control parameter.

According to the present invention, in calculating the indicated torque request, it is possible to add another losses or loads other than the dynamic loss, the internal loss and the external load shown in FIG. 2. On the contrary, for the purpose of simplifying the calculation, it is possible to delete part of the dynamic loss, the internal loss and the external load shown in FIG. 2.

The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A control apparatus for an internal combustion engine comprising:
    judging means for judging a torque amount requested by a driver;
    control means for controlling operating conditions of an internal combustion engine based on said requested torque amount; and torque variation suppressing means, responsive to adjustment of a subjective control parameter causing a significant torque variation according to the engine operating conditions, for converting a torque variation amount to be caused by the adjustment of said subjective control parameter into an equivalent adjustment amount of a supplementary control parameter non-relevant to said adjustment of said subjective control parameter, and for changing said supplementary control parameter by said equivalent adjustment amount so as to suppress the torque variation amount to be caused.

2. The control apparatus for an internal combustion engine in accordance with claim 1, further comprising combustion mode switching means for selecting either a stratified combustion mode or a homogeneous combustion mode in accordance with the engine operating conditions, so that fuel is directly injected into a cylinder at a compression stroke to cause stratified combustion when said stratified combustion mode is selected and at an intake stroke to cause homogeneous combustion when said homogeneous combustion mode is selected, wherein said torque variation suppressing means suppresses torque variation responsive to a change of a control parameter adjusted to maintain stable combustion condition before and after switching of the combustion mode by correcting a fuel amount when said stratified combustion mode is selected and by correcting an air amount and/or an ignition timing when said homogeneous combustion mode is selected.

3. The control apparatus for an internal combustion engine in accordance with claim 2, wherein said torque variation suppressing means corrects said requested torque amount when said requested torque amount is converted into the fuel amount in said stratified combustion mode and corrects said requested torque amount when said requested torque amount is converted into the air amount in said homogeneous combustion mode.

4. A control apparatus for a cylinder injection type internal combustion engine comprising:

combustion mode switching means for selecting either a stratified combustion mode or a homogeneous combustion mode in accordance with engine operating conditions, so that fuel is directly injected into a cylinder at a compression stroke to cause stratified combustion when said stratified combustion mode is selected and at an intake stroke to cause homogeneous combustion when said homogeneous combustion mode is selected;

stratified combustion mode controlling means for obtaining a target fuel amount based on an indicated torque request to be generated from the internal combustion engine during said stratified combustion mode as well as based on an engine rotational speed, and for obtaining other control parameter by using said target fuel amount; and homogeneous combustion mode controlling means for obtaining a target air amount based on an indicated torque request to be generated from the internal combustion engine during said homogeneous combustion mode as well as based on the engine rotational speed, and for obtaining other control parameter by using said target air amount.

5. The control apparatus for a cylinder injection type internal combustion engine in accordance with claim 4, wherein indicated torque request calculating means is provided for calculating said indicated torque request, and each of said stratified combustion mode controlling means and said homogeneous combustion mode controlling means uses said indicated torque request obtained by said indicated torque request calculating means.

6. The control apparatus for a cylinder injection type internal combustion engine in accordance with claim 4, wherein target air-fuel ratio setting means is provided for setting a target air-fuel ratio based on said indicated torque request and said engine rotational speed, said stratified combustion mode controlling means calculates a target air amount and a target throttle opening degree based on said target air-fuel ratio determined by said target air-fuel ratio setting means as well as based on said target fuel amount, and said homogeneous combustion mode controlling means calculates a target fuel amount based on said target air-fuel ratio determined by said target air-fuel ratio setting means as well as based on a detection value or an estimated value of an actual air amount.

7. A control apparatus for an internal combustion engine comprising:

indicated torque request calculating means for calculating an indicated torque request to be generated from the internal combustion engine for controlling said internal combustion engine based on said indicated torque request;

wherein said indicated torque request calculating means calculates said indicated torque request considering a dynamic torque loss caused by an inertial force responsive to a change of engine rotational speed in addition to a static torque loss of said internal combustion engine.

8. The control apparatus for an internal combustion engine in accordance with claim 7, wherein said indicated torque request calculating means calculates said dynamic torque loss by multiplying an inertial moment of a rotary member rotating in synchronism with a crankshaft of said internal combustion engine with a rotational angular acceleration.

9. The control apparatus for an internal combustion engine in accordance with claim 7, wherein said indicated torque request calculating means obtains said indicated torque request by adding a requested axle torque, said dynamic torque loss, said static torque loss, and an external load torque of an accessory or the like installed on said internal combustion engine.

* * * * *